United States Patent
Förster et al.

(10) Patent No.: US 8,269,132 B2
(45) Date of Patent: Sep. 18, 2012

(54) METHOD FOR ELECTRICAL DISCHARGE MACHINING OF ELECTRICALLY NON-CONDUCTIVE MATERIAL

(75) Inventors: Ralf Förster, Berlin (DE); Karsten Klein, Berlin (DE); Ulrich Laudien, Berlin (DE); Silke Settegast, Berlin (DE); Ramesh Subramanian, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 642 days.

(21) Appl. No.: 12/225,518

(22) PCT Filed: Feb. 16, 2007

(86) PCT No.: PCT/EP2007/051501
§ 371 (c)(1),
(2), (4) Date: Oct. 16, 2009

(87) PCT Pub. No.: WO2007/110277
PCT Pub. Date: Oct. 4, 2007

(65) Prior Publication Data
US 2010/0038344 A1    Feb. 18, 2010

(30) Foreign Application Priority Data
Mar. 24, 2006   (EP) .................... 06006138

(51) Int. Cl.
*B23H 1/06*    (2006.01)
(52) U.S. Cl. ................... 219/69.15; 219/69.17
(58) Field of Classification Search .......... None
See application file for complete search history.

(56) References Cited

U.S. PATENT DOCUMENTS
6,024,792 A    2/2000   Kurz et al.

FOREIGN PATENT DOCUMENTS

| | | | |
|---|---|---|---|
| DE | 4102250 | A1 | 7/1992 |
| EP | 0 306 454 | A1 | 3/1989 |
| EP | 0 412 397 | B1 | 2/1991 |
| EP | 0 486 489 | B1 | 5/1992 |
| EP | 0 786 017 | B1 | 7/1997 |
| EP | 0 892 090 | A1 | 1/1999 |
| EP | 1 204 776 | B1 | 5/2002 |
| EP | 1 319 729 | A1 | 6/2003 |
| JP | 61168422 | A * | 7/1986 |
| JP | 63150109 | A * | 6/1988 |
| JP | 04041120 | A * | 2/1992 |
| WO | WO 99/67435 | A1 | 12/1999 |
| WO | WO 00/44949 | A1 | 8/2000 |

OTHER PUBLICATIONS

English abstract for JP 2001212723A cited by applicant, Aug. 7, 2001, Hoden.*
English abstract for JP10202431A cited by applicant, Aug. 4, 1998, Mitsubishi.*
English abstract for JP62099021A1 cited by applicant, May 8, 198, Hitachi.*

* cited by examiner

*Primary Examiner* — David E Graybill

(57) ABSTRACT

The invention relates to a method for electrical discharge machining of electrically non-conductive material in which a layer of an electrically conductive substance is applied as an auxiliary electrode on the electrically non-conductive material. Said method is characterized in that the electrically conductive substance is chemically converted by oxidative heat treatment after electrical discharge machining.

19 Claims, 3 Drawing Sheets

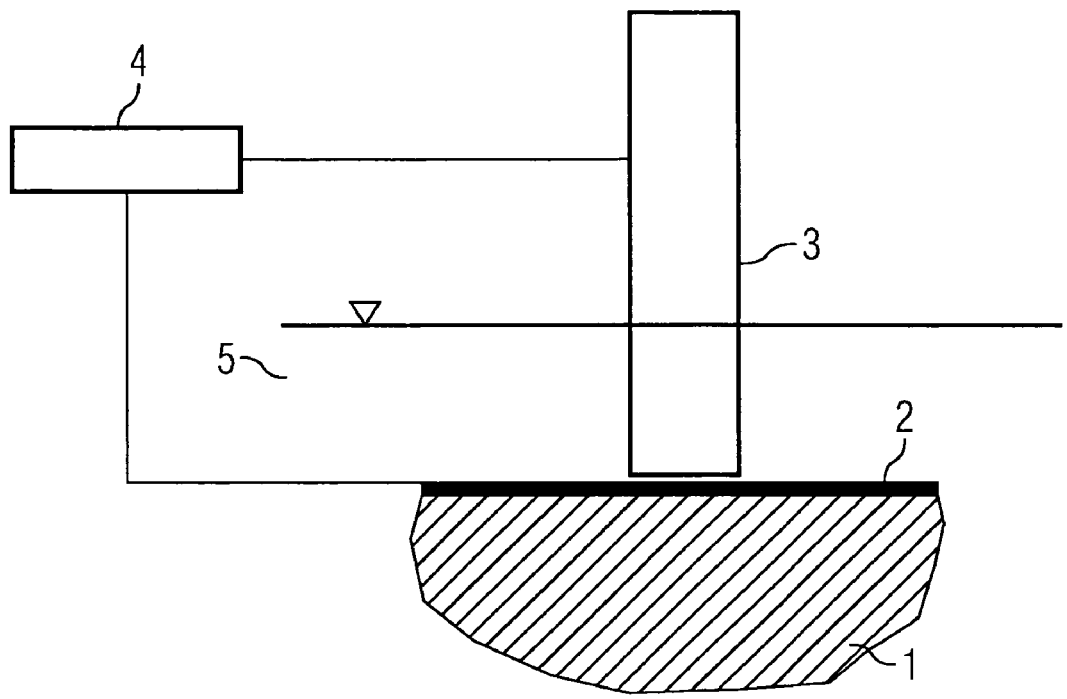
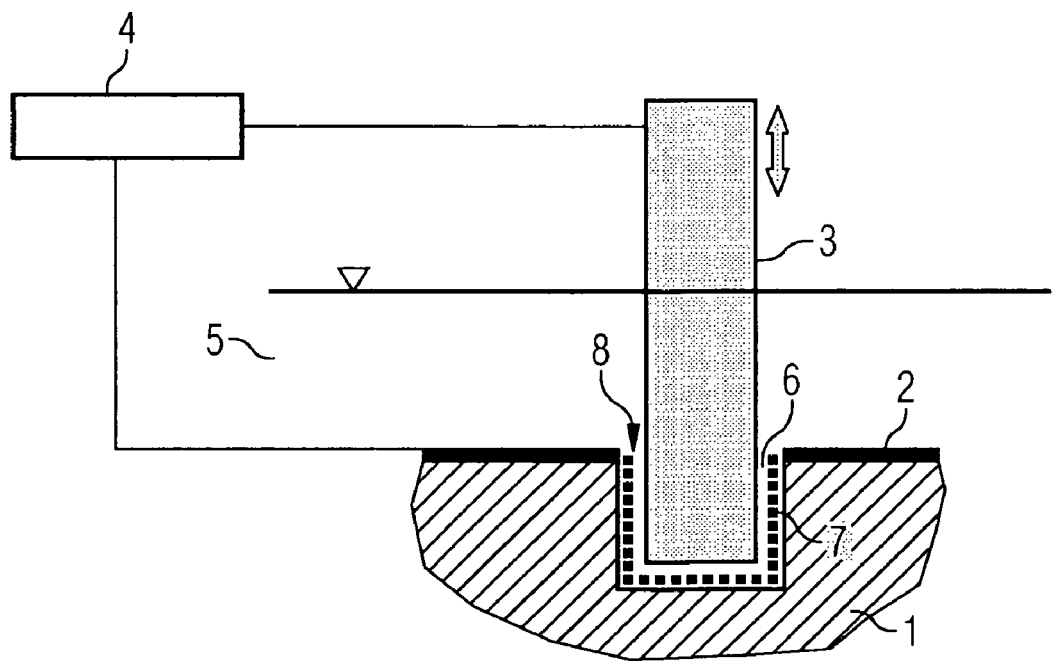

METHOD FOR ELECTRICAL DISCHARGE MACHINING OF ELECTRICALLY NON-CONDUCTIVE MATERIAL

CROSS REFERENCE TO RELATED APPLICATIONS

This application is the US National Stage of International Application No. PCT/EP2007/051501, filed Feb. 16, 2007 and claims the benefit thereof. The International Application claims the benefits of European application No. 06006138.9 filed Mar. 24, 2006, both of the applications are incorporated by reference herein in their entirety.

FIELD OF INVENTION

The invention relates to a method for the electrical discharge machining of an electrically non-conductive material, in which a layer of an electrically conductive substance is applied as an auxiliary electrode to the electrically non-conductive material.

BACKGROUND OF THE INVENTION

Electrical discharge machining methods for electrically non-conductive materials are known in the prior art. They are used, inter alia, to make bores in structural parts provided with a ceramic coating. Thus in turbine blades, for instance, which have a ceramic heat-insulating layer on a metallic basic element, cooling-air bores are made by spark erosion.

In DE 41 02 250 A1, a method for the electrical discharge machining of electrically non-conductive materials is described in general terms. In this method, the non-conductive material, prior to its machining, is coated with an electrically conductive substance. This layer is used as an auxiliary electrode, which, in the electrical discharge machining, creates an electrical contact with a working electrode. The electrically non-conductive material coated with the auxiliary electrode, and at least that end region of the working electrode which points to the auxiliary electrode and on which, in the machining, the spark discharge is realized, are immersed in a dielectric, which is formed by a fluid such as kerosene or even by a gas.

If a voltage is applied to the arrangement, between the working electrode and the auxiliary electrode a spark discharge is realized and, subsequently, an erosion of the auxiliary electrode as well as of the underlying electrically non-conductive material. At the same time, a part of the dielectric is cracked, whereby carbon or conductive carbides are generated, which are deposited in the form of an electrically conductive layer onto the exposed surface regions of the non-conductive material. The electrically conductive layer which is deposited in this way thus replaces the removed material of the auxiliary electrode and, when the working electrode penetrates into the non-conductive material, creates a conductive connection to the surface of the non-conductive material, so that a continuous machining is possible.

A drawback of this method is that the layer of the electrically conductive substance, forming the auxiliary electrode, has to be laboriously removed after the electrical discharge machining. Additional problems can arise if remaining remnants of the electrically conductive substance interact in such a way with the electrically non-conductive material that they adversely affect the quality and strength thereof. In the worst case, the remnants of the electrically conductive substance react during operation with the electrically non-conductive material and thus cause damage thereto.

SUMMARY OF INVENTION

The object of the present invention is to provide a method for the electrical discharge machining of an electrically non-conductive material, in which laborious remachining operations are unnecessary.

According to the invention, the object is achieved by a method for the electrical discharge machining of an electrically non-conductive material, in which the electrically conductive substance, after the electrical discharge machining, is chemically converted by, for example, oxidative heat treatment. The basic notion of the method according to the invention is therefore to use an electrically conductive substance as an auxiliary electrode, which, following completion of the electrical discharge machining, is chemically converted, in particular oxidized, and so is either removed or else is present in a form which does not impair the properties of the electrically non-conductive material.

One advantage of the method is that the electrically non-conductive material, after the electrical discharge machining, does not have to be laboriously cleaned of the electrically conductive substance and, above all, nor is there the danger that remaining remnants of the substance might impair the quality of the electrically non-conductive material.

In one embodiment of the invention, the electrically conductive substance is an organic compound, such as an electrically conductive polymer. The advantage is here that the polymer can be quickly and easily applied in the form of a solution, whereupon the solvent evaporates and an electrically conductive layer remains on the surface.

The electrically conductive substance can also be converted by oxidative heat treatment into at least one gaseous compound. In this way, it can be particularly easily removed from the electrically non-conductive material. Organic compounds can be combusted, for example, to form gaseous $CO_2$ and water, which then automatically escape as gas, so that no residue remains.

Tests have shown that the method according to the invention is very well suited for the machining of ceramics, in particular of ceramics which contain or consist of a metal oxide. This applies in a preferred manner if the metal oxide is zirconium oxide.

The electrically conductive substance can be a metal which is also contained in the metal oxide of the ceramic. In order to protect said metal from oxidation during the electrical discharge machining, inert dielectrics such as kerosene can be used, which completely cover the metal. Since this means that essentially no oxidation takes place, the electrical conductivity of the metal is also maintained.

If the electrically conductive substance is a metal contained in the metal oxide, the metal can be easily converted by oxidative heat treatment into the metal oxide, so that it is present as an identical constituent of the electrically non-conductive material. This serves to ensure that the converted substance cannot adversely affect the properties of the electrically non-conductive material.

Since many ceramic heat-insulating layers contain zirconium oxide, it has proved to be advantageous if, as the electrically conductive substance, metallic zirconium is used. This can then be converted at high temperatures and under the presence of oxygen into zirconium oxide and thus becomes an integral constituent of the heat-insulating layer.

With the aid of the method according to the invention, coatings of an electrically non-conductive material on a structural part can be worked by electrical discharge machining. This applies, in particular, if the coating in question is a heat-insulating layer, for instance, on a part of a turbine or combustion chamber, such as a moving blade or stationary blade. In this case, the electrically conductive substance can, in fact, advantageously be converted after the electrical discharge machining, by oxidative heat treatment, into an integral constituent of the heat-insulating layer. The heat treatment can be easily realized, particularly in respect of parts of turbines or of combustion chambers, by these being burnt out or put into use. Such high temperatures are here generated that the oxidative conversion takes place.

BRIEF DESCRIPTION OF THE DRAWINGS

The method according to the invention is explained in greater detail below with reference to two drawings, wherein:

FIG. 1 shows in schematic representation an arrangement for implementing the method for the electrical discharge machining of electrically non-conductive materials according to the present invention prior to the start of the machining, FIG. 2 shows the arrangement from FIG. 1 during the machining.

DETAILED DESCRIPTION OF INVENTION

Figure 3:
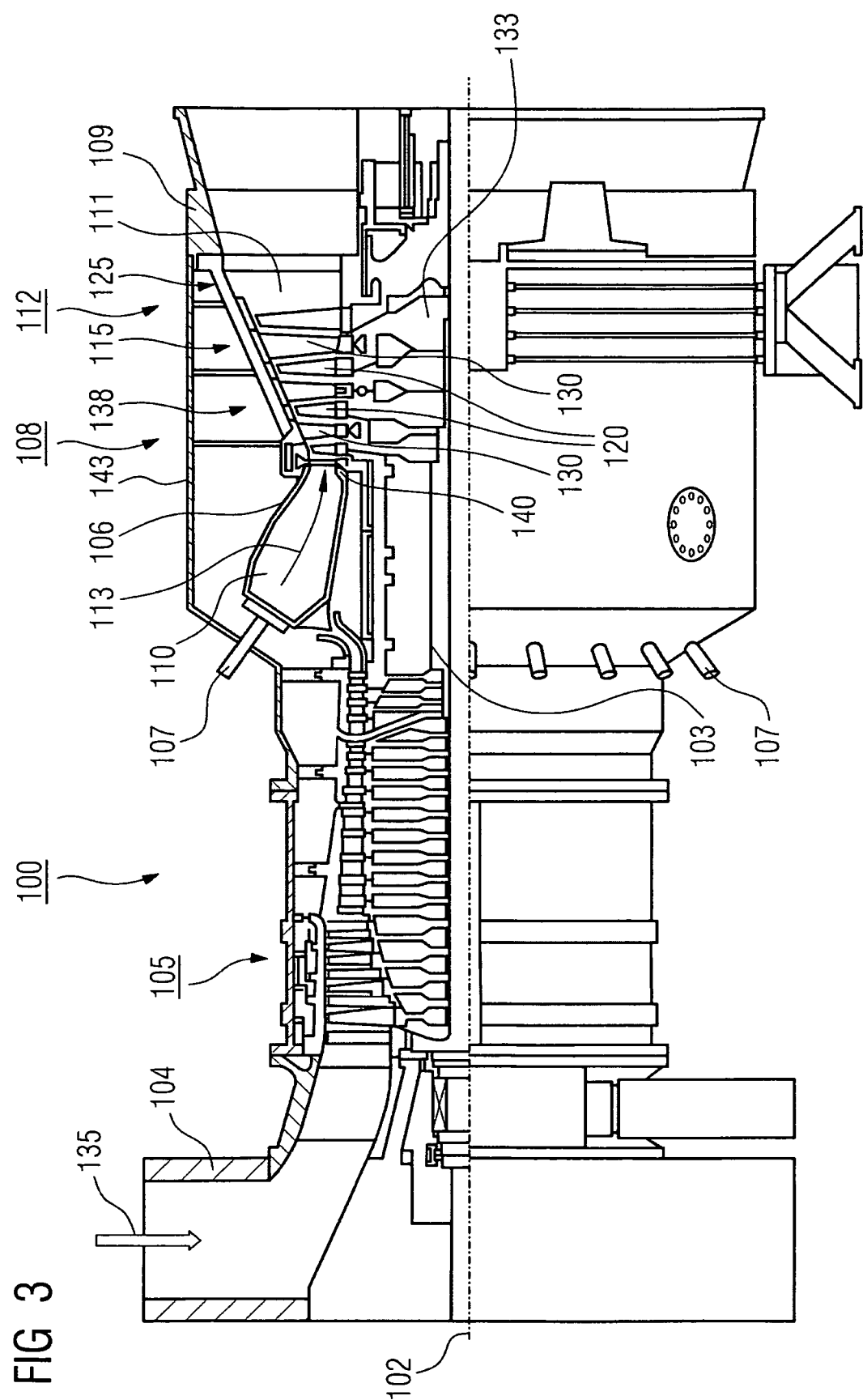
FIG. 3 shows a gas turbine.
Figure 4:
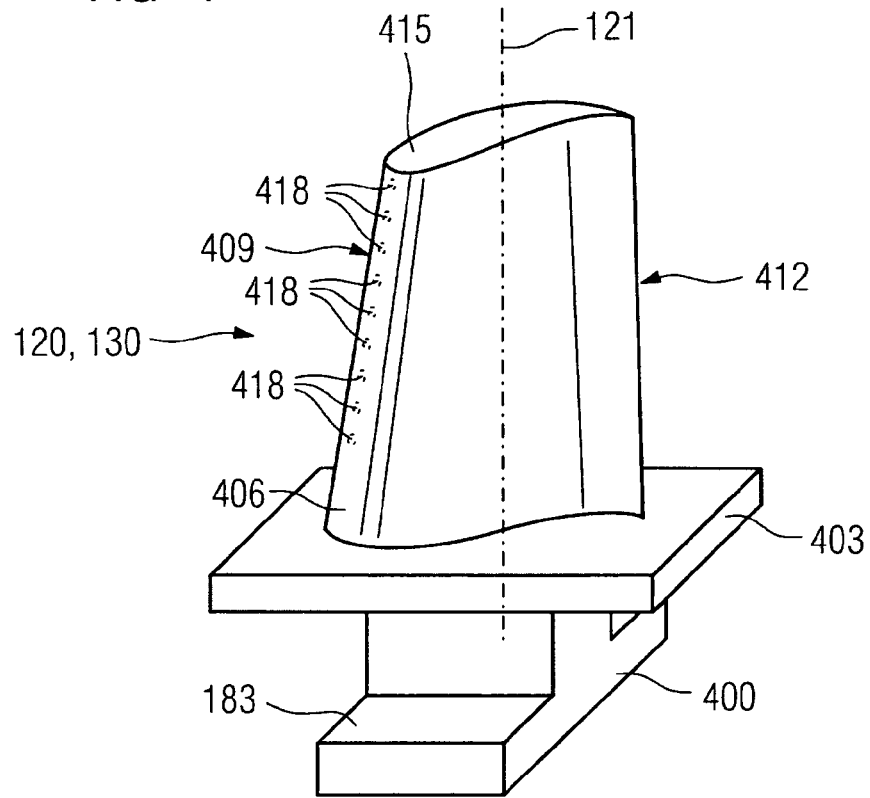
FIG. 4 shows a turbine blade.

FIG. 1 shows an arrangement for implementing the method according to the invention for the electrical discharge machining of electrically non-conductive materials, here in the form of a structural part 1 which consists of ceramic containing zirconium oxide. The structural part 1 can be part of a turbine or a combustion chamber, for example a moving 120 (FIGS. 3, 4) or stationary blade 130 (FIGS. 3, 4). It is also possible for the electrically non-conductive material to form a coating on a metallic basic element of a turbine blade, which coating can also be realized as a heat-insulating layer.

To the structural part 1, a layer of metallic zirconium is flatly applied as an auxiliary electrode 2. Alternatively, as the electrically conductive substance, an organic compound can also be used.

The auxiliary electrode 2 and a working electrode 3 are connected in an electrically conductive manner to a generator 4, which applies a suitable voltage to both electrodes 2, 3. The electrodes 2, 3 are arranged in direct proximity to each other and immersed in a dielectric 5, which can be constituted, for example, by kerosene or a further fluid described in the prior art.

In order to machine the structural part 1 using the electrical discharge method according to the invention, in a first step the auxiliary electrode 2 is applied, for instance, using PVD (Physical Vapor Deposition) and is then, jointly with the working electrode 3, electrically connected to the generator 4. Next, the structural part 1 and at least the lower part of the working electrode 3 is immersed in the dielectric 5. During the electrical discharge machining, the dielectric 5 protects the auxiliary electrode 2 of metallic zirconium from oxidation.

After the working electrode 3 has been brought into direct proximity to the auxiliary electrode 2 and a suitable voltage has been applied to the electrodes 2, 3, an electrical contact in the form of sparking is realized between the electrodes 2, 3, whereby the auxiliary electrode 2 and the ceramic material of the structural part 1 in a machining region 6 are evaporated and thus eroded to form an opening 8. As a result of the spark discharge, parts of the dielectric 5, furthermore, are cracked, and the generated cracking products are then deposited in the form of an electrically conductive layer 7 on the structural part 1. The depositing takes place in the machining region 6, the deposited layer 7 replacing the auxiliary electrode 2, so that, in a continuation of the method, a sparking is realized between the deposited layer 7 and the working electrode and, subsequently, the deposited layer 7 as well as the ceramic material of the structural part 1 are further eroded, the eroded regions of the layer 7 being continually refilled by the cracking products.

Once the electrical discharge machining is ended, the electrical connections to the generator 4 are released, the working electrode 3 is removed from the machining region 6 and the structural part 1 is removed from the dielectric 5. The structural part 1 can be crudely precleaned by rinsing or spraying down, or even directly subjected to an oxidative heat treatment. To this end, it can be heated, for example with the auxiliary electrode 2 applied thereto, in an oxidizing environment. Under the presence of oxygen, the metallic zirconium of the auxiliary electrode 2 is converted into zirconium oxide, which is also contained in the structural part 1. In this way, the auxiliary electrode 2 is converted into an integral constituent of the structural part 1 and thus does not disturb the properties and nature thereof.

Where the auxiliary electrode 2 consists of an organic compound, this can be converted by the oxidative heat treatment into gaseous compounds such as $CO_2$ and $H_2O$, which escape automatically.

The oxidative heat treatment can be realized, particularly in respect of turbine blades, in a simple manner by burning out or by entry into use.

FIG. 3 shows by way of example a gas turbine 100 in a longitudinal part-section.

The gas turbine 100 has within it a rotor 103 rotatably mounted about a rotation axis 102 and having a shaft 101, which rotor is also referred to as a turbine rotor.

Along the rotor 103, a suction housing 104, a compressor 105, a, for example, toroidal combustion chamber 110, in particular an annular combustion chamber, having a plurality of coaxially arranged burners 107, a turbine 108 and the exhaust gas housing 109 follow one upon another.

The annular combustion chamber 110 communicates with a, for example, annular hot-gas duct 111. There, for example, four turbine stages 112, connected one behind the other, form the turbine 108.

Each turbine stage 112 is formed, for example, from two blade rings. Viewed in the flow direction of a working medium 113, in the hot-gas duct 111 a row of stationary blades 115 is followed by a row 125 formed from moving blades 120.

The stationary blades 130 are here fastened to an inner housing 138 of a stator 143, whereas the moving blades 120 of a row 125 are attached, for example by means of a turbine disk 133, to the rotor 103.

Coupled to the rotor 103 is a generator or a work machine (not represented).

During the operation of the gas turbine 100, air 135 is sucked up by the compressor 105 through the suction housing 104 and compressed. The compressed air provided at the turbine-side end of the compressor 105 is led to the burners 107 and mixed there with a combustion agent. The mixture is then combusted in the combustion chamber 110, with the formation of the working medium 113. From there, the working medium 113 flows along the hot-gas duct 111 past the stationary blades 130 and the moving blades 120. At the moving blades 120, the working medium 113 expands in such a way as to transmit a pulse, so that the moving blades 120 drive the rotor 103 and this drives the work machine which is coupled thereto.

The structural parts exposed to the hot working medium 113 are subjected during the operation of the gas turbine 100 to thermal loads. The stationary blades 130 and moving blades 120 of the first turbine stage 112 viewed in the flow direction of the working medium 113, apart from the heat shield elements lining the annular combustion chamber 110, are placed under the greatest thermal load.

In order to withstand the temperatures prevailing there, said blades can be cooled by means of a coolant.

Similarly, substrates of the structural parts can have a directional structure, i.e. they are monocrystalline (SX structure) or have only longitudinally directed grains (DS structure). As material for the structural parts, in particular for the turbine blades 120, 130 and structural parts of the combustion chamber 110, iron, nickel or cobalt based superalloys, for example, are used.

Such superalloys are known, for example, from EP 1 204 776 B 1, EP 1 306 454, EP 1 319 729 A1, WO 99/67435 or WO 00/44949; these publications, with respect to the chemical composition of the alloys, are part of the disclosure.

The stationary blade 130 has a stationary blade root (not represented here), facing the inner housing 138 of the turbine 108, and a stationary blade head situated opposite the stationary blade root. The stationary blade head is facing the rotor 103 and is fixed to a fastening ring 140 of the stator 143.

FIG. 4 shows in perspective view a moving blade 120 or stationary blade 130 of a flow machine, extending along a longitudinal axis 121.

The flow machine can be a gas turbine of an aircraft or of an electricity generating power station, a steam turbine or a compressor.

The blade 120, 130 has along the longitudinal axis 121, successively, a fastening region 400, an adjoining blade platform 403, as well as a blade leaf 406 and a blade tip 415.

As the stationary blade 130, the blade 130 can have on its blade tip 415 a further platform (not represented).

In the fastening region 400, a blade root 183 is formed, which serves to fasten the moving blades 120, 130 to a shaft or a disk (not represented).

The blade root 183 is configured, for example, as a hammer head. Other embodiments as a fir tree or dovetail root are possible.

The blade 120, 130 has, for a medium flowing past the blade leaf 406, a leading edge 409 and a trailing edge 412.

In traditional blades 120, 130, solid metallic materials, particularly superalloys, are used in all regions 400, 403, 406 of the blade 120, 130.

Such superalloys are known, for example, from EP 1 204 776 B1, EP 1 306 454, EP 1 319 729 A1, WO 99/67435 or WO 00/44949; these publications, with respect to the chemical composition of the alloy, are part of the disclosure.

The blade 120, 130 can here be produced by a casting method, also by means of directional solidification, by a forging method, by a milling method, or by combinations thereof.

Workpieces of monocrystalline structure or structures are used as structural parts for machines which are exposed during operation to high mechanical, thermal and/or chemical loads.

The production of monocrystalline workpieces of this type is realized, for example, by directional solidification from the melt. This involves casting methods in which the fluid metallic alloy solidifies into the monocrystalline structure, i.e. into the monocrystalline workpiece, or solidifies directionally. In this case, dendritic crystals are aligned along the heat flow and form either a columnar crystalline grain structure (columnar, i.e. grains which run over the entire length of the workpiece and are here referred to, in accordance with common parlance, as directionally solidified) or a monocrystalline structure, i.e. the entire workpiece consists of a single crystal. In these methods, it is necessary to avoid the transition to globulitic (polycrystalline) solidification, since, through non-directional growth, transverse and longitudinal grain boundaries are necessarily formed, which destroy the beneficial properties of the directionally solidified or monocrystalline structural part.

If general reference is made to directionally solidified structures, then by this are meant both monocrystals, which have no grain boundaries or, at most, small-angle grain boundaries, and columnar crystal structures, which though they have grain boundaries running in the longitudinal direction, have no transverse grain boundaries. In the case of these latter crystalline structures, the term "directionally solidified structures" is also used.

Such methods are known from U.S. Pat. No. 6,024,792 and EP 0 892 090 A1; these publications, with respect to the solidification method, are part of the disclosure.

Similarly, the blades 120, 130 may have coatings against corrosion or oxidation, for example (MCrAlX; M is at least one element of the group iron (Fe), cobalt (Co), nickel (Ni), X is an active element and stands for yttrium (Y) and/or silicon and/or at least one element of the rare earths, or hafnium (Hf)). Such alloys are known from EP 0 486 489 B 1, EP 0 786 017 B1, EP 0 412 397 B1 or EP 1 306 454 A1, which, with respect to the chemical composition of the alloy, are intended to be part of this disclosure. The density is preferably around 95% of the theoretical density.

On the MCrAlX layer (as the intermediate layer or as the outermost layer), a protective aluminum oxide layer is formed (TGO=thermal grown oxide layer).

On the MCrAlX, a further heat-insulating layer can be present, which is preferably the outermost layer and consists, for example, of $ZrO_2$, $Y_2O_3$—$ZrO_2$, i.e. it is non-, partially or fully stabilized by yttrium oxide and/or calcium oxide and/or magnesium oxide.

The heat-insulating layer covers the entire MCrAlX layer. Through suitable coating methods, such as, for example, electron beam evaporation (EB-PVD), columnar grains are produced in the heat-insulating layer.

Other coating methods are conceivable, for example atmospheric plasma spraying (APS), LPPS, VPS or CVD. The heat-insulating layer can have porous, microcracked or macrocracked grains for better thermal shock resistance. The heat-insulating layer is thus preferably more porous than the MCrAlX layer.

The blade 120, 130 can be of hollow or solid construction. If the blade 120, 130 is intended to be cooled, it is hollow and also, if necessary, has film-cooling holes 418 (indicated in dashed representation), which are preferably created with the method according to the invention.

Figure 5:
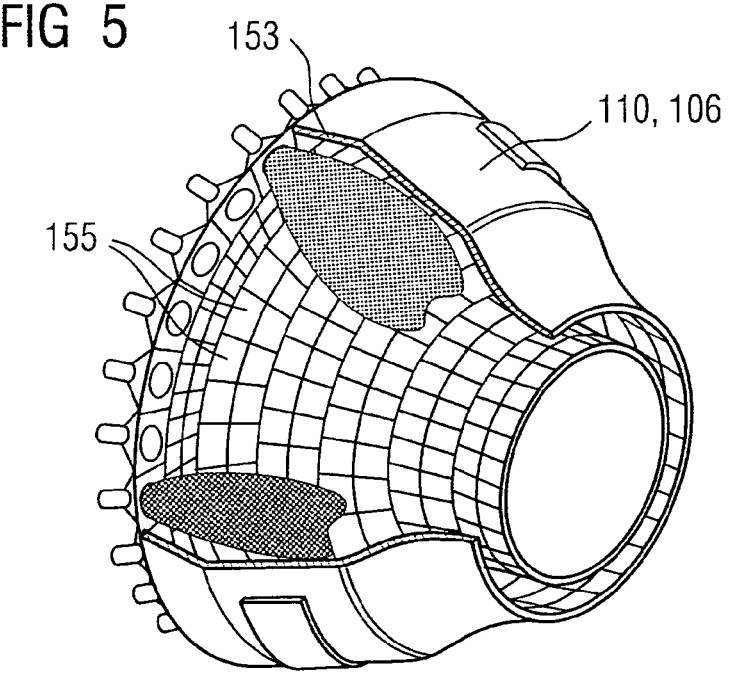
FIG. 5 shows a combustion chamber.

FIG. 5 shows a combustion chamber 110 of the gas turbine 100. The combustion chamber 110 is configured, for example, as a so-called annular combustion chamber, in which a multiplicity of burners 107 arranged peripherally around a rotation axis 102 open out into a common combustion chamber space 154, which burners generate flames 156. To this end, the combustion chamber 110 is configured in its entirety as an annular structure, which is positioned around the rotation axis 102.

In order to obtain a comparatively high level of efficiency, the combustion chamber 110 is designed for a comparatively high temperature of the working medium M, ranging from about 1000° to 1600°. In order to allow a comparatively long operating period, even under these operating parameters which are unfavorable to the materials, the combustion chamber wall 153 is provided, on its side facing the working medium M, with an inner lining formed from heat shield elements 155.

Due to the high temperatures inside the combustion chamber 110, for the heat shield elements 155, or for their holding elements, a cooling system can additionally be provided. The heat shield elements 155 are then, for example, hollow and also, if necessary, have cooling holes (not represented), which open out into the combustion chamber space 154 and are preferably created with the method according to the invention.

Each heat shield element 155 made of an alloy is equipped on the working medium side with a particularly heat-resistant protective layer (MCrAlX layer and/or ceramic coating) or is produced from highly temperature resistant material (solid ceramic bricks).

These protective layers can be similar to the turbine blades, i.e. with MCrAlX signifying, for example: M is at least one element of the group iron (Fe), cobalt (Co), nickel (Ni), X is an active element and stands for yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1, which, with respect to the chemical composition of the alloy, are intended to be part of this disclosure.

On the MCrAlX, a further, for example, ceramic heat-insulating layer can be present, which consists, for example, of $ZrO_2$, $Y_2O_3$—$ZrO_2$, i.e. it is non-, partially or fully stabilized by yttrium oxide and/or calcium oxide and/or magnesium oxide.

By suitable coating methods, such as, for example, electron beam evaporation (EB-PVD), columnar grains are produced in the heat-insulating layer.

Other coating methods are conceivable, for example atmospheric plasma spraying (APS), LPPS, VPS or CVD. The heat-insulating layer can have porous, microcracked or macrocracked grains for better thermal shock resistance.

Refurbishment means that turbine blades 120, 130, heat shield elements 155, following their use, must, if necessary, be rid of protective layers (for example, by sandblasting). After this, a removal of the corrosion and/or oxidation layers or products takes place. If necessary, cracks in the turbine blade 120, 130 or the heat shield element 155 are also additionally repaired. Subsequently, the turbine blades 120, 130, heat shield elements 155, are recoated and the turbine blades 120, 130 or the heat shield elements 155 reused.

Here too, the method according to the invention can be used for the reopening of holes.

The invention claimed is:

1. A method for the electrical discharge machining of an electrically non-conductive material, comprising:

applying a layer of an electrically conductive substance to the electrically non-conductive material as an auxiliary electrode; and chemically converting the electrically conductive substance, following the electrical discharge machining.

2. The method as claimed in claim 1, wherein the electrically conductive substance is chemically converted via an oxidative treatment.

3. The method as claimed in claim 2, wherein the electrically conductive substance is chemically converted via an oxidative heat treatment.

4. The method as claimed in claim 3, wherein the electrically conductive substance is a polymer.

5. The method as claimed in claim 4, wherein the electrically conductive substance is converted by the oxidative heat treatment into at least one gaseous compound.

6. The method as claimed in claim 5, wherein the electrically conductive substance is chemically converted and then removed.

7. The method as claimed in claim 6, wherein the electrically non-conductive material is a ceramic.

8. The method as claimed in claim 7, wherein the ceramic consists of a metal oxide.

9. The method as claimed in claim 8, wherein the metal oxide is zirconium oxide.

10. The method as claimed in claim 9, wherein the electrically conductive substance is a metal which is also contained in the metal oxide.

11. The method as claimed in claim 10, wherein the metal, during the electrical discharge machining, is protected from oxidation by complete covering with a non-oxidizing dielectric.

12. The method as claimed in claim 11, wherein the metal is converted by the oxidative heat treatment into the metal oxide.

13. The method as claimed in claim 12, wherein the metal is metallic zirconium, which is converted by the oxidative heat treatment into zirconium oxide.

14. The method as claimed in claim 13, wherein the electrically non-conductive material is a coating on a structural part.

15. The method as claimed in claim 14, wherein the coating is a heat-insulating layer.

16. The method as claimed in claim 15, wherein the electrically conductive substance is converted by the oxidative heat treatment into an integral constituent of the heat-insulating layer.

17. The method as claimed claim 16, wherein the structural part is a part of a turbine or of a combustion chamber.

18. The method as claimed in claim 17, wherein the structural part is a moving or stationary blade.

19. The method as claimed claim 18, wherein the oxidative heat treatment is realized by burning out or entry into use.

* * * * *